UNITED STATES PATENT OFFICE.

GUSTAVE O. ZELLER, OF RAHWAY, NEW JERSEY.

PROCESS OF MAKING PYROXYLIN SOLVENTS.

SPECIFICATION forming part of Letters Patent No. 555,596, dated March 3, 1896.

Application filed December 30, 1893. Serial No. 495,237. (No specimens.)

*To all whom it may concern:*

Be it known that I, GUSTAVE O. ZELLER, a citizen of the United States, residing at Rahway, county of Union, State of New Jersey, have invented certain new and useful Improvements in a Process of Manufacturing Pyroxyline Solvents and their Products; and I do hereby declare the following to be a full, clear, and exact description of the invention, which will enable others skilled in the art to which it appertains to use the same.

My invention has for its object the preparation of thick and thin solutions of pyroxyline by dissolving soluble pyroxyline in a solvent obtained by preparing benzine compounds of or with simple or mixed ethers or esters by subjecting mixtures of alcohols, which are either solvents of pyroxyline or are not solvents of pyroxyline by themselves, and benzine in the presence of a compounding organic acid, to the action of hydrochloric acid. Thus, for instance, by subjecting a mixture of wood-alcohol—say one part, by weight—and fusel-oil—say six parts, by weight—and benzine—say two to four parts, by weight—to the action of hydrochloric acid and in the presence of a compounding organic acid—say formic acid or acetic acid—in suitable proportions there results an amyl-ethyl-acetate or formiate-benzine compound, or rather an acetic or formic compound of an amyl-methyl-benzine ether, which compound, thus prepared, is an excellent solvent of pyroxyline as well as of the gum-resins employed in the art of making pyroxyline compounds, such as shellac, rosin, kauri, &c., and are diluents of other solvents and of the solutions of other solvents and of their own solutions of pyroxyline.

I dissolve or suspend any suitable mineral chloride in the alcoholic-benzine mixture—for example, chloride of calcium, chloride of magnesium, of lithium, &c.—and after adding the compounding-acid in a concentrated state or rather pure state I subject this solution to distillation, thus freeing the hydrochloric acid of the chlorides, which now etherifies the alcoholic-benzine mixture.

I find that I may substitute for benzine any other substance composed of hydrocarbon—viz., benzole, turpentine, camphor, &c.

I am well aware that it is old to pass a current of hydrochloric-acid gas through any mixture to be etherified, but this is an entirely new process of etherification, as the hydrochloric-acid gas is set free in the alcoholic-benzine mixture, while in the old process a separate generator and a separate generating-acid were used for the hydrochloric-acid gas. The products thus derived are to be cleansed and purified by rectification, washing and filtering, if necessary, in the usual ways known to those skilled in the art.

Having thus described my invention, what I claim, and desire to secure by Letters Patent, is—

1. The herein-described process of preparing a solvent of pyroxyline which consists of a benzine compound of mixed or simple ethers by subjecting a mixture of one or more alcohols, benzine and a compounding-acid to the action of hydrochloric acid.

2. The herein-described process of preparing a solvent of pyroxyline which consists of a benzine compound of mixed or simple esters by subjecting a mixture of one or more alcohols, benzine and a compounding-acid to the action of hydrochloric acid.

GUSTAVE O. ZELLER.

Witnesses:
A. L. DUTROW,
C. L. BORGMEYER.